United States Patent [19]
Dee

[11] Patent Number: 6,097,570
[45] Date of Patent: Aug. 1, 2000

[54] MULTI-ELEMENT READ/WRITE TAPE HEAD WITH LOW FEEDTHROUGH

[75] Inventor: Richard H. Dee, Louisville, Colo.

[73] Assignee: Storage Technology Corporation, Louisville, Colo.

[21] Appl. No.: 09/153,922

[22] Filed: Sep. 16, 1998

[51] Int. Cl.[7] .............................. G11B 5/265; G11B 5/115
[52] U.S. Cl. ............................................................ 360/121
[58] Field of Search .................................. 360/129, 121, 360/113, 128

[56] References Cited

U.S. PATENT DOCUMENTS

| | | |
|---|---|---|
| 4,008,493 | 2/1977 | Pizzuto . |
| 4,713,710 | 12/1987 | Soda et al. ............................. 360/121 |
| 4,967,301 | 10/1990 | Lopez et al. . |
| 4,972,336 | 11/1990 | Reid et al. . |

*Primary Examiner*—Robert S. Tupper
*Attorney, Agent, or Firm*—Brooks & Kushman P.C.

[57] ABSTRACT

A multi-element read/write tape head with low feedthrough includes a multi-element write module with a plurality of write elements. Each write element can write a data track onto magnetic tape as the magnetic tape passes over the write module tape contact surface. The tape head also includes at least one multi-element read module in close proximity with the write module. Each read module has a magnetically permeable substrate, a plurality of read elements built on the substrate top surface, and a cover over each read element and a portion of the substrate top surface. Each read element can read a data track from the magnetic tape as the magnetic tape passes over the read module tape contact surface. The substrate bottom surface is facing the write module thereby providing a low reluctance path for feedthrough from each write element that does not include any read element.

10 Claims, 2 Drawing Sheets

MULTI-ELEMENT READ/WRITE TAPE HEAD WITH LOW FEEDTHROUGH

TECHNICAL FIELD

The present invention relates to multi-element read/write thin film tape heads with reduced feedthrough from a write element to a read element during read-while-write operations.

BACKGROUND ART

In order to meet the demand for increasing areal densities in magnetic tape, many technological innovations are required. A first technological innovation is the ability to write multiple data tracks on a magnetic tape simultaneously. This can be accomplished through the use of a multi-element tape head containing a sequence of write elements, each write element writing one track across the width of the tape. In order to improve data reliability, a read element corresponding to each write element reads the magnetic field from the tape immediately after it is written. This technique is known as read-while-write. To increase data transfer, the tape may be written as it travels in either direction across the tape head. This requires a read element on either side of each write element, resulting in a read-write-read head configuration.

A second technological innovation increasing magnetic tape areal density is the continued shrinking of data track width and spacing between data tracks. This reduction in track geometry requires a corresponding reduction in the size and spacing of read and write elements. Thin film technologies have the dimensions of tape head elements to shrink at a rate mirroring that of the integrated circuit industry.

Increasing track densities and decreasing tape head geometries create many new design challenges and magnify existing problems. One such difficulty is feedthrough. Feedthrough occurs during a read-while-write operation when a read element receives a magnetic signal directly from a write element transmitted either through the air or through the tape head itself. This direct magnetic signal appears as noise degrading the signal read from the magnetic tape.

Many techniques to reduce feedthrough have been developed. Most of these techniques require the addition of magnetically permeable shields around read elements, write elements, or both. The addition of such magnetic shields requires additional material, additional processing steps, and increased head size. What is needed is a technique for reducing feedthrough that does not add significant material, cost, or complexity to the tape head.

SUMMARY OF THE INVENTION

It is an object of the present invention to provide a tape deck having reduced feedthrough from a write element to a read element.

It is another object of the present invention to provide a read/write tape head with reduced feedthrough that requires no additional material over present read/write tape heads.

Still another object of the present invention is to provide a read/write tape head with reduced feedthrough having substantially the same complexity as present read/write tape heads.

In carrying out the above objects and other objects and features of the present invention, a multi-element read/write tape head with low feedthrough is provided. The tape head includes a multi-element write module with a plurality of write elements. Each write element can write a data track onto magnetic tape as the magnetic tape passes over the write module tape contact surface. The tape head also includes at least one multi-element read module in close proximity with the write module. Each read module has a magnetically permeable substrate, a plurality of read elements built on the substrate top surface, and a cover over each read element and a portion of the substrate top surface. Each read element can read a data track from the magnetic tape as the magnetic tape passes over the read module tape contact surface. The substrate bottom surface is facing the write module thereby providing a low reluctance path for feedthrough from each write element that does not include any read element.

In an embodiment of the present invention, the substrate is nickel-zinc (NiZn) ferrite.

In another embodiment of the present invention, the at least one read module is two read modules.

In still another embodiment of the present invention, the length of the substrate is at least two times as long as the length of the cover.

In yet another embodiment of the present invention, a metal shield is placed between the write module and each read module.

Another tape head is provided for writing to and reading from magnetic tape as the tape passes over the head tape contact surface. The tape head includes a write module having a write substrate, write elements, and a write cover. The write substrate is constructed of an insulating material and extends to a first distance behind the tape contact surface. The write elements are deposited on the write substrate front surface in a pattern permitting multiple tracks to be written onto the tape simultaneously. The write cover is constructed of an insulating material. The write cover front surface extends over the write elements and a portion of the write substrate front surface, extending to a second distance behind the tape contact surface. The first distance is at least twice as long as the second distance. The tape head also includes a first read module having a first read substrate, a first plurality of read elements, and a first read cover. The first read substrate is constructed of a magnetically permeable material and extends to the first distance behind the tape contact surface. The first read substrate back surface is adjacent to the write substrate back surface. The read elements are deposited on the first read substrate front surface in a pattern permitting each of the written tracks to be read. The first read cover is constructed of a magnetically permeable material and extends over the read elements and a portion of the first read substrate front surface. The first read cover extends to the second distance behind the tape contact surface. The tape head further includes a second read module having a second read substrate, a second plurality of read elements, and a second read cover. The second read module is constructed in a manner similar to the first read module and is positioned so that the back surface of the second read substrate is adjacent to the back surface of the write cover.

The above objects and other objects, features, and advantages of the present invention are readily apparent from the following detailed description of the best modes for carrying out the invention when taken in connection with the accompanying drawings.

BEST MODES FOR CARRYING OUT THE INVENTION

Figure 1:
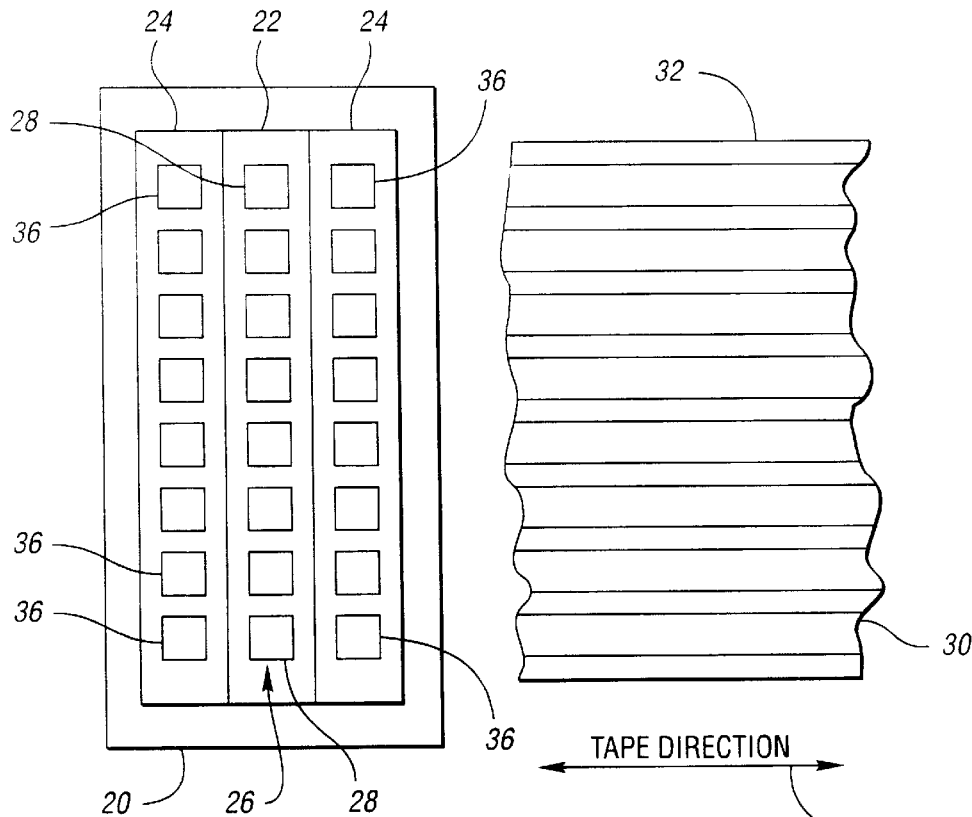
FIG. 1 is a conceptualized drawing of a magnetic tape and a multi-element read/write head.

Referring now to FIG. 1, a conceptualized drawing of a magnetic tape and a multi-element read/write tape head is shown. Tape head 20 includes write module 22 in between two read modules 24. Write module 22 includes a sequence of write elements, shown generally by 26. Each write element 28 in sequence of write elements 26 can write data track 30 onto tape 32 as tape 32 moves past write module 22 in tape direction 34.

In order to ensure the accuracy of data written onto tape 32, read element 36 in read module 24 senses the magnetic fields written onto data track 30. If the read signal does not conform to the written signal, an error has occurred and the track can be rewritten. Since read element 36 is operating concurrently with write elements 28, feedthrough may occur between any write element 28 and read element 36.

Figure 2:
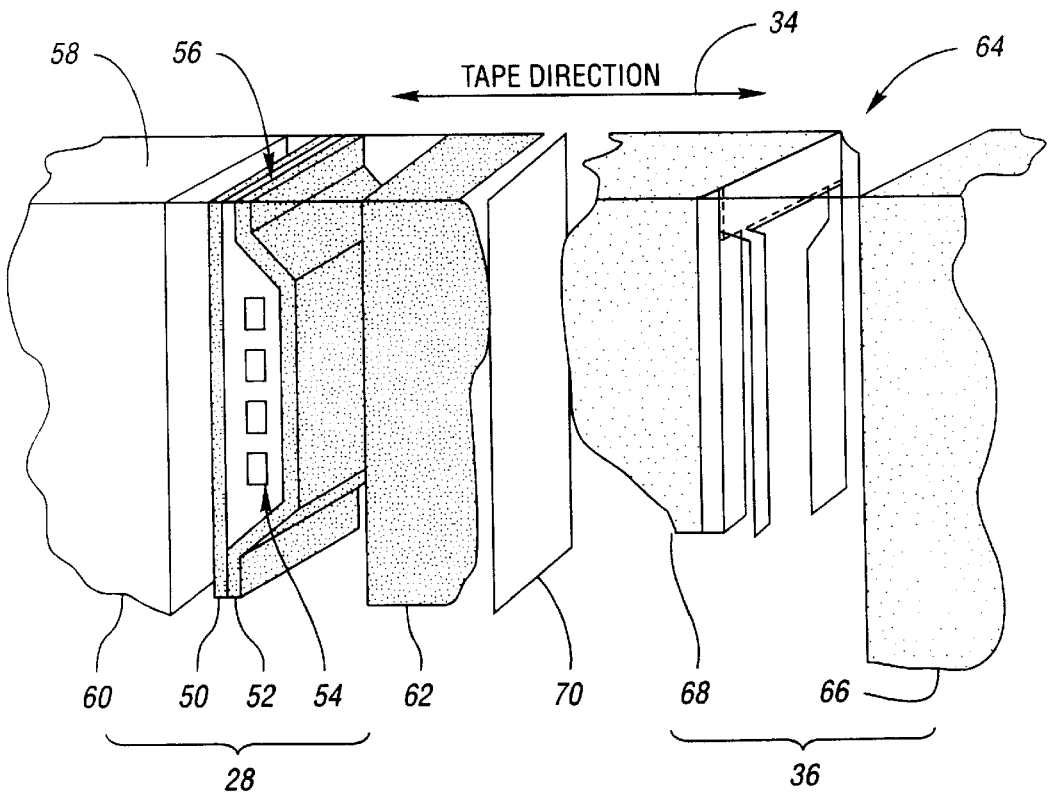
FIG. 2 is a conceptualized perspective drawing of a thin film write element and a thin film read element in a tape head.

Referring now to FIG. 2, a conceptualized perspective drawing of a thin film write element and thin film read element in a tape head is shown. The proportions shown for write element 28 and read element 36 is not accurate and the spacing between elements 28,36 is much greater than actually shown.

An electromagnet is formed by bottom pole 50, top pole 52, and coil 54 in write element 28. A current in coil 54 induces flux in poles 50,52. This flux produces a field at gap 56. As tape 32 moves across tape contact surface 58 in either direction shown as tape direction 34, the field produced by current in coil 54 produces magnetization fields on tape 32 that have a magnetization direction corresponding to the direction in which current flows through coil 54. Tape 32 is not shown for clarity.

Poles 50,52 are typically constructed of a magnetically permeable alloy or amorphous mixture including at least one of elements cobalt, nickel, and iron. Coil 54 is a conductor, such as copper, that is insulated from poles 50,52. This insulation extends into gap 56. This insulation may be built from layers of photoresist with a layer of alumina against one of poles 50,52, the alumina extending into gap 56. Write element 28 may be built on write substrate 60 and capped with write cover 62, both of which may be constructed of an insulator with good wear properties such as AlTiC.

Read element 36 typically includes magnetoresistive sensor 64 which exhibits a change in resistance due to magnetization fields on magnetic tape 32 moving over tape contact surface 58 in tape direction 34. Magnetoresistive sensor 64 is built on read substrate 66 and includes read cover 66. Read substrate 66 and read cover 66 are typically made of a magnetically permeable material, such as nickel-zinc (NiZn) ferrite, to enhance the sensitivity of magnetoresistive sensor 64.

Previous methods to reduce feedthrough between write element 28 and read element 36 include shield 70. Shield 70 is typically constructed of a conducting material such as brass.

Figure 3:
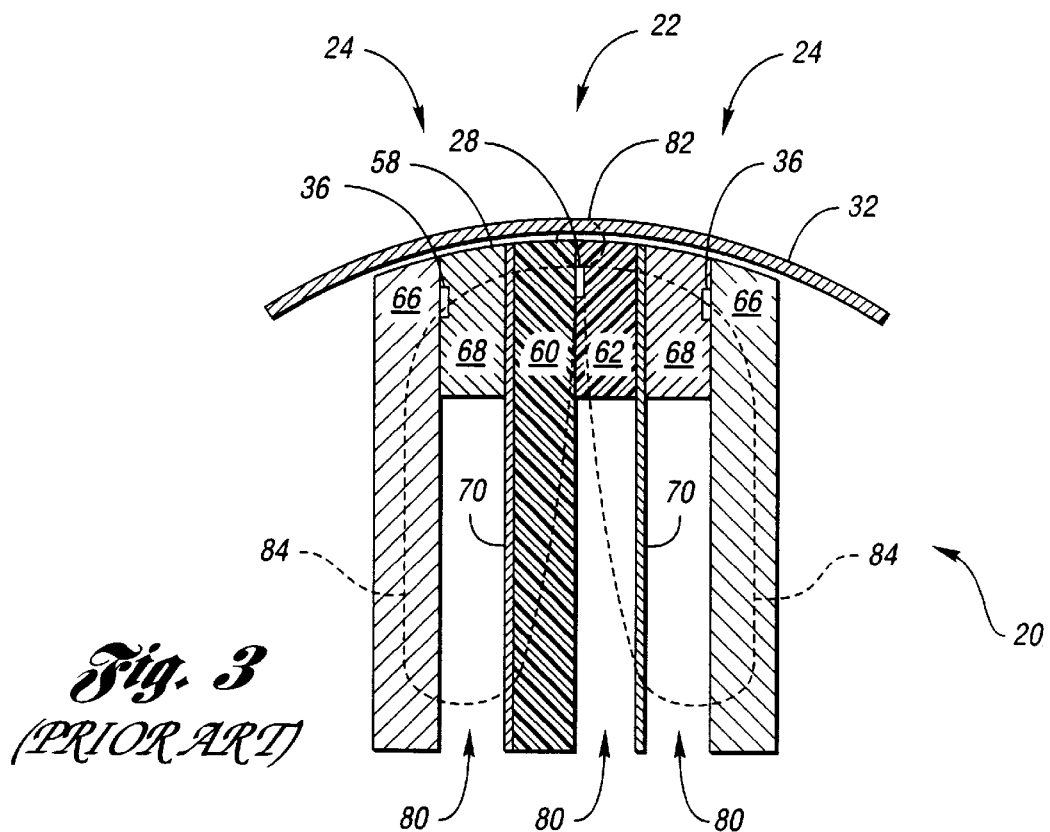
FIG. 3 is a conceptualized cross-sectional drawing of a prior art read-write-read head.

Referring now to FIG. 3, a conceptualized cross-sectional drawing of a prior art read-write-read head is shown. Tape head 20 includes write module 22 between two read modules 24. Write module 22 includes write substrate 60 onto which write elements 28 are formed and write cover 62. Write substrate 60 extends at least twice as far as write cover 62 behind tape contact surface 58. Each read module 24 includes read substrate 66 onto which read elements 36 are formed and read cover 68. Likewise, read substrate 66 extends at least twice as far as read cover 68 behind tape contact surface. In each case, the shorter cover 62,68 forms cavity 80 which permits cabling, not shown for clarity, to connect to write elements 28 and read elements 36.

Tape 32 is written to and read from as it passes over tape contact surface 58. Ideally, when write elements 28 convert write current to flux, all of the flux goes directly to forming magnetic fields on tape 32. This write flux is shown by 82. Unfortunately, some of the flux from write elements 28 may flow directly through read modules 24. Such feedthrough flux is shown by 84. Since the long, magnetically permeable read substrate 66 offers a low reluctance path, feedthrough flux 84 is drawn through read cover 68 and read elements 36. Feedthrough flux 84 crossing read elements 36 creates undesirable feedthrough noise.

Figure 4:
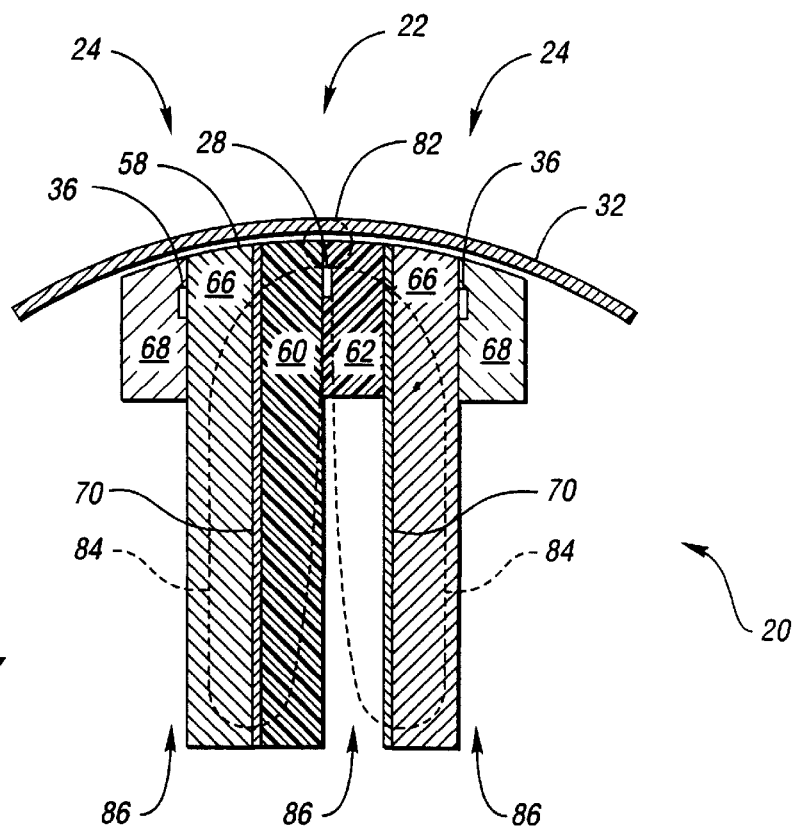
FIG. 4 is a conceptualized cross-sectional drawing of a read-write-read head according to the present invention.

Referring now to FIG. 4, a conceptualized cross-sectional drawing of a read-write-read head according to the present invention is shown. The feedthrough noise problem is reduced by having read substrate 66 bottom surface face write module 22, thereby providing a low reluctance path for feedthrough from each write element 28 that does not include any read element 36. In particular, head 20 is constructed such that the relatively longer, low reluctance read substrate 66 is between write module 22 and each read element 36. This draws feedthrough flux 84 away from read elements 36 rather than through read elements 36. Space 86 is still provided for routing cabling, not shown for clarity, to write elements 28 and read elements 36.

While the best modes for carrying out the invention have been described in detail, other implementations are possible within the spirit and scope of the present invention. Those familiar with the art to which this invention relates will recognize various alternative designs and embodiments for practicing the invention as defined by the following claims.

What is claimed is:

1. A multi-element read/write tape head with low feedthrough comprising:

a multi-element write module comprising a write substrate having a top surface and an opposing bottom surface, a plurality of write elements built on the write substrate top surface, each write element operative to write a data track onto magnetic tape as the magnetic tape passes over the write module tape contact surface, and a write cover having a top surface and an opposing bottom surface, the write cover top surface over each write element and a portion of the write substrate top surface;

a metal shield in contact with the write substrate bottom surface;

a first multi-element read module comprising a magnetically permeable read substrate having a top surface and an opposing bottom surface, a plurality of read elements built on the substrate top surface, and a read cover over each read element and a portion of the read substrate top surface, each read element operative to read a data track from the magnetic tape as the magnetic tape passes over the read module tape contact surface, wherein the read substrate bottom surface is in contact with the metal shield on a side of the metal shield opposite from the write module; and a second multi-element read module built onto the write element cover bottom surface.

2. A multi-element read/write tape head as in claim 1 wherein the read substrate is nickel-zinc (NiZn) ferrite.

3. A multi-element read/write tape head as in claim 1 wherein the length of the write substrate and the read substrate in the direction generally behind the tape contact surface is at least two times as long as the length of the read cover in the direction generally behind the tape contact surface.

4. A read-write-read head for writing to and reading from magnetic tape as the tape passes over a tape contact surface, the head exhibiting low feedthrough from write elements to read elements during read-while-write operation, the head comprising:

a write module comprising
  a write substrate having a top surface and an opposing bottom surface joined by an end surface and constructed of an insulating material,
  a plurality of write elements deposited on the write substrate top surface in a pattern permitting multiple tracks to be written onto the tape simultaneously, and
  a write cover having a top surface and an opposing bottom surface joined by an end surface and constructed of an insulating material, the write cover top surface built over the plurality of write elements and a portion of the write substrate top surface;

a first read module comprising
  a first read substrate having a top surface and an opposing bottom surface joined by an end surface and constructed of a magnetically permeable material, the first read substrate bottom surface built onto the write substrate bottom surface,
  a first plurality of read elements deposited on the first read substrate top surface in a pattern permitting each of the written tracks to be read, and
  a first read cover having a top surface and an opposing bottom surface joined by an end surface and constructed of a magnetically permeable material, the first read cover top surface built over the first plurality of read elements and a portion of the first read substrate top surface; and a second read module comprising
  a second read substrate having a top surface and an opposing bottom surface joined by an end surface and constructed of a magnetically permeable material, the second read substrate bottom surface built onto the write cover bottom surface,
  a second plurality of read elements deposited on the second read substrate top surface in a pattern permitting each of the written tracks to be read, and
  a second read cover having a top surface and an opposing bottom surface joined by an end surface and constructed of a magnetically permeable material, the second read cover top surface built over the second plurality of read elements and a portion of the second read substrate top surface;
  wherein the tape contact surface is formed by the write substrate end surface, the write cover end surface, the first read substrate end surface, the first read cover end surface, the second read substrate end surface, and the second read cover end surface.

5. A read-write-read head as in claim 4 wherein at least one from a set including the first read substrate, the first read cover, the second read substrate, and the second read cover is made of a material comprising nickel-zinc (NiZn) ferrite.

6. A read-write-read head as in claim 4 further comprising a first metal shield between the write substrate bottom surface and the first read substrate bottom surface and a second metal shield between the write cover bottom surface and the second read substrate bottom surface.

7. A read-write-read head as in claim 6 wherein the first metal shield and the second metal shield are made of a material comprising brass.

8. A read-write-read head as in claim 4 wherein the write substrate and the write cover are made of a material comprising aluminum titanium carbide (AlTiC).

9. A read-write-read head as in claim 4 wherein the write substrate, the first read substrate, and the second read substrate each extend to a first distance behind the tape contact surface.

10. A read-write-read head as in claim 9 wherein the write cover, the first read cover, and the second read cover each extend to a second distance behind the tape contact surface, the first distance at least twice as long as the second distance.

* * * * *